United States Patent
Snapy et al.

(10) Patent No.: US 10,447,598 B2
(45) Date of Patent: Oct. 15, 2019

(54) USER DATAGRAM PROTOCOL (UDP) RECEIVE OFFLOADING

(71) Applicant: QUALCOMM Incorporated, San Diego, CA (US)

(72) Inventors: Haim Snapy, San Diego, CA (US); Harout Hedeshian, Erie, CO (US); Pranav Desai, San Diego, CA (US); Yuval Corey Hershko, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 1 day.

(21) Appl. No.: 15/651,944

(22) Filed: Jul. 17, 2017

(65) Prior Publication Data

US 2019/0020587 A1   Jan. 17, 2019

(51) Int. Cl.
| | |
|---|---|
| *H04L 12/801* | (2013.01) |
| *H04L 29/06* | (2006.01) |
| *H04L 12/741* | (2013.01) |
| *H04W 28/02* | (2009.01) |
| *H04L 29/08* | (2006.01) |

(52) U.S. Cl.
CPC .............. *H04L 47/12* (2013.01); *H04L 45/74* (2013.01); *H04L 67/2804* (2013.01); *H04L 67/2833* (2013.01); *H04L 69/02* (2013.01); *H04L 69/22* (2013.01); *H04W 28/0289* (2013.01)

(58) Field of Classification Search
None
See application file for complete search history.

(56) References Cited

U.S. PATENT DOCUMENTS

| | | | |
|---|---|---|---|
| 6,618,397 B1 | 9/2003 | Huang | |
| 8,045,585 B2 | 10/2011 | Mohaban et al. | |
| 8,553,572 B2 | 10/2013 | Farrell et al. | |
| 8,825,900 B1* | 9/2014 | Gross, IV | H04L 47/31 709/238 |
| 9,130,991 B2 | 9/2015 | Hughes | |
| 9,560,081 B1* | 1/2017 | Woolward | H04L 63/20 |
| 9,660,909 B2* | 5/2017 | Guichard | H04L 45/74 |
| 2004/0057434 A1* | 3/2004 | Poon | H04L 12/56 370/392 |
| 2004/0123109 A1* | 6/2004 | Choi | H04L 9/3239 713/176 |
| 2009/0219919 A1* | 9/2009 | Li | H04N 21/236 370/351 |
| 2010/0002696 A1* | 1/2010 | Vare | H04L 12/1836 370/390 |
| 2013/0039278 A1* | 2/2013 | Bouazizi | H04L 65/4076 370/328 |
| 2013/0117847 A1* | 5/2013 | Friedman | H04L 63/102 726/22 |
| 2014/0075557 A1* | 3/2014 | Balabine | H04L 63/20 726/23 |

(Continued)

*Primary Examiner* — Michael J Moore, Jr.
(74) *Attorney, Agent, or Firm* — Patterson&Sheridan, LLP

(57) ABSTRACT

Certain aspects of the present disclosure relate to methods and apparatus for providing UDP receive offloading using the communications systems. For example, a method generally includes grouping, into a container, the datasets from the same source and destination arriving at a receiver based on datasets metadata, and ungrouping the datasets from the container once network layer processing on the container is completed and datasets are ready to traverse to a next destination.

24 Claims, 7 Drawing Sheets

(56) References Cited

U.S. PATENT DOCUMENTS

| | | | |
|---|---|---|---|
| 2014/0180904 A1* | 6/2014 | Parsons | G06Q 40/04 |
| | | | 705/37 |
| 2016/0156561 A1* | 6/2016 | Kruglick | H04L 63/1441 |
| | | | 370/230.1 |
| 2016/0182380 A1* | 6/2016 | Mehra | H04L 47/125 |
| 2017/0078203 A1 | 3/2017 | Judge et al. | |
| 2017/0317932 A1* | 11/2017 | Paramasivam | H04L 47/125 |
| 2017/0366605 A1* | 12/2017 | Chang | H04L 47/70 |
| 2018/0069658 A1* | 3/2018 | Benisty | H04L 1/0057 |
| 2018/0069788 A1* | 3/2018 | Lizotte | H04L 43/028 |
| 2018/0191642 A1* | 7/2018 | Biederman | H04L 12/4641 |

\* cited by examiner

USER DATAGRAM PROTOCOL (UDP) RECEIVE OFFLOADING

FIELD

The present disclosure relates generally to communication systems, and more particularly, to methods and apparatus for providing user datagram protocol (UDP) receive offloading using the communications systems.

BACKGROUND

Communication systems are widely deployed to provide various services such as telephony, video, data, messaging, and broadcasts. Typical communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, Next Generation Node B (gNB), etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for communication access continues to increase, there exists a desire for further improvements in communication technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved reduce the user datagram protocol (UDP) overhead processing.

Certain aspects provide a method of processing datasets at a receiver. The method generally includes receiving one or more packets, grouping, into a container, datasets received in the one or more packets based on datasets metadata, and ungrouping the datasets from the container once processing on the container is completed at a first processing layer and datasets are ready to traverse to a second processing layer.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
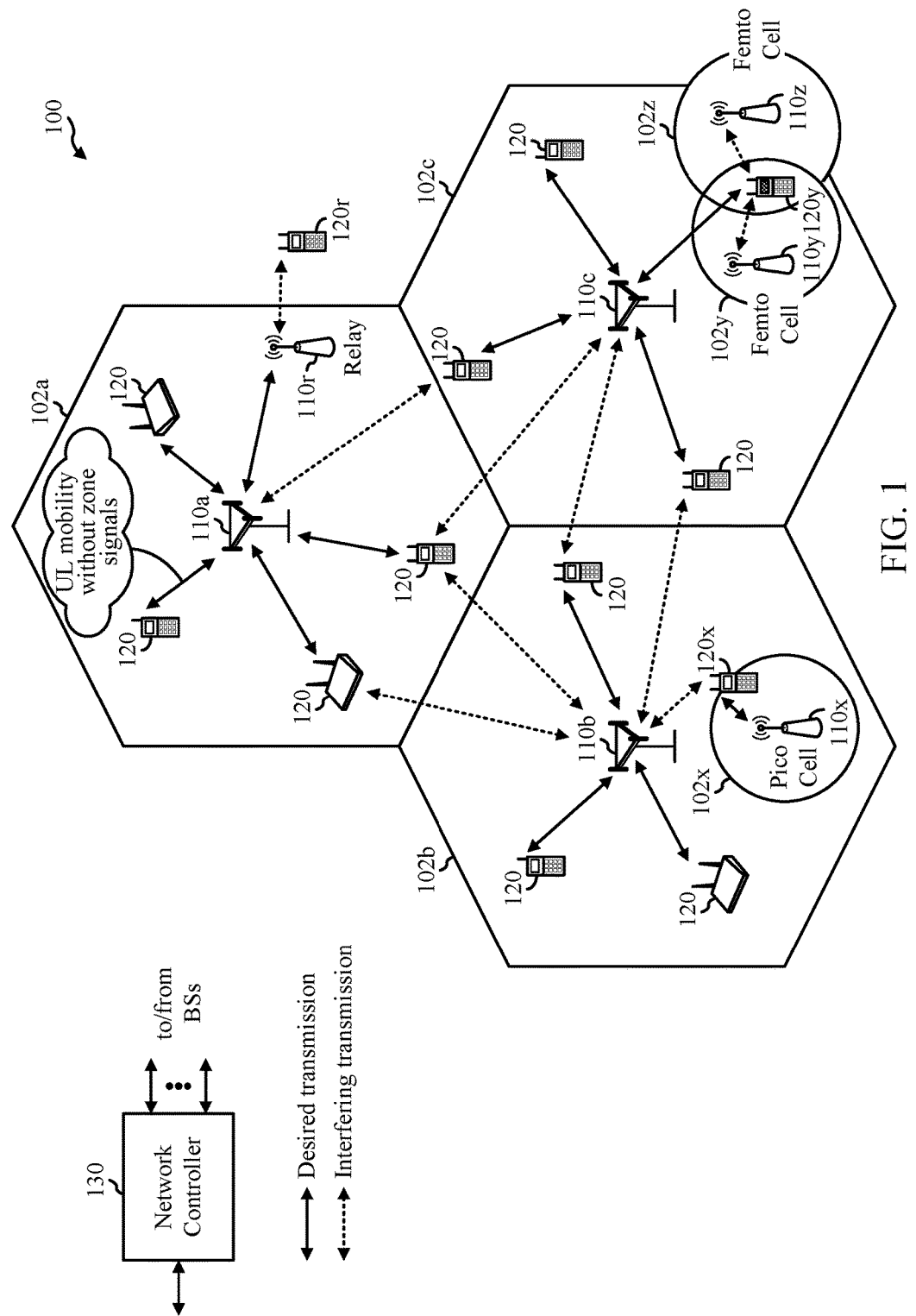
FIG. 1 is a block diagram conceptually illustrating an example telecommunications system, in which aspects of the present disclosure may be performed.

Aspects of the present disclosure provide apparatus, methods, processing systems, and computer readable mediums for reducing user datagram protocol (UDP) overhead processing without manipulating characteristics of a UDP connection.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wired communication networks and for various wireless communication networks such as NR, LTE, CDMA, TDMA, FDMA, OFDMA, SC-FDMA as well as any other networks or combination thereof. NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (SGTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). "LTE" refers generally to LTE, LTE-Advanced (LTE-A), LTE in an unlicensed spectrum (LTE-whitespace), etc. The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, gNB, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a healthcare device, a biometric sensor/device, a wearable device such as a smart watch, smart clothing, smart glasses, virtual reality goggles, a smart wrist band, smart jewelry (e.g., a smart ring, a smart bracelet, etc.), an entertainment device (e.g., a music device, a video device, a satellite radio, etc.), a vehicular component or sensor, a smart meter/sensor, a robot, a drone, industrial manufacturing equipment, a positioning device (e.g., GPS, Beidou, terrestrial), or any other suitable device that is configured to communicate via a wireless or wired medium. Some UEs may be considered machine-type communication (MTC) devices or evolved MTC (eMTC) devices, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. MTC and eMTC UEs include, for example, robots, drones, remote devices, sensors, meters, monitors, cameras, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. MTC UEs, as well as other UEs, may be implemented as Internet-of-Things (IoT) devices, e.g., narrowband IoT (NB-IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (e.g., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
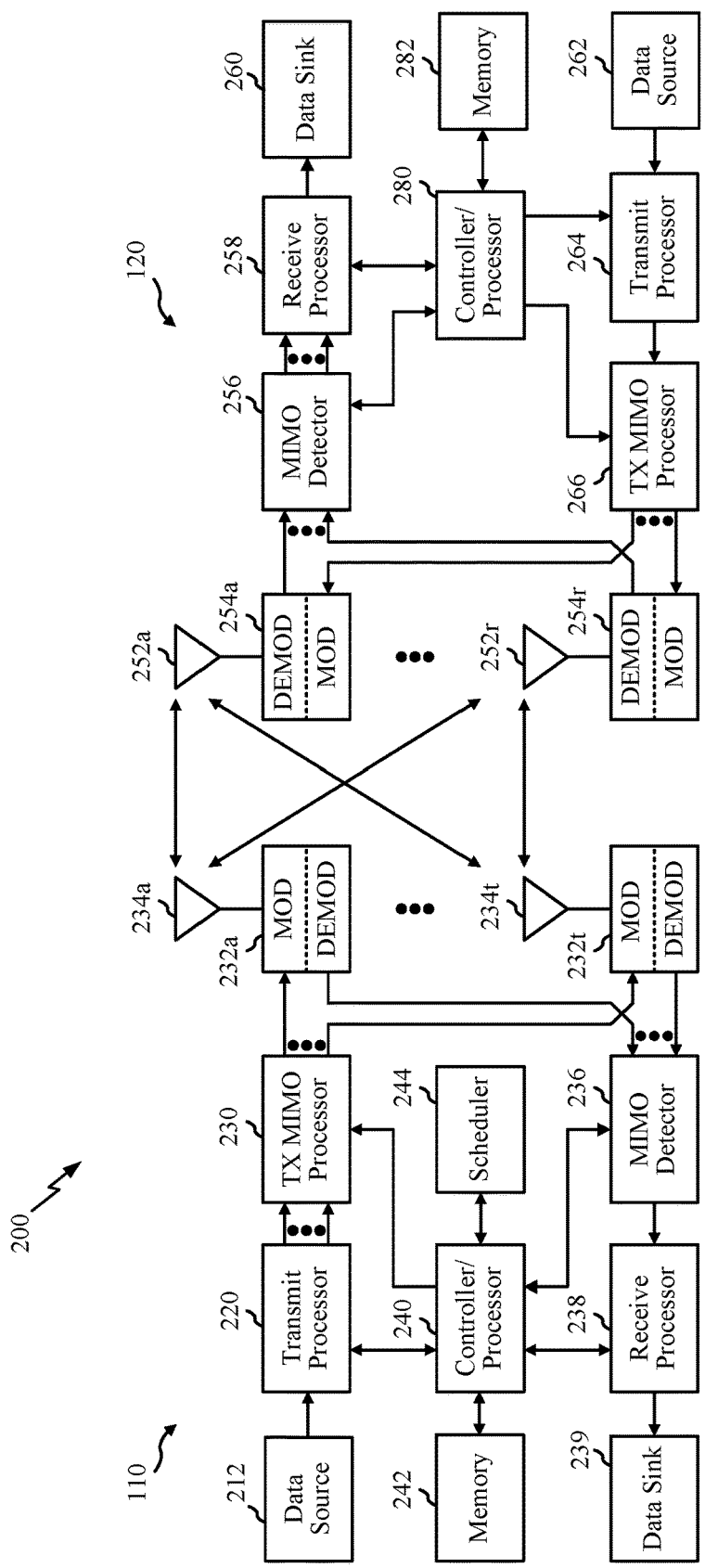
FIG. 2 is a block diagram conceptually illustrating a design of an example BS and user equipment (UE), in accordance with certain aspects of the present disclosure.

FIG. 2 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 252, processors 266, 258, 264, and/or controller/processor 280 of the UE 120 and/or antennas 234, processors 230, 220, 238, and/or controller/processor 240 of the BS 110 may be used to perform the operations described herein and illustrated with reference to FIG. 7.

FIG. 2 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 234a through 234t, and the UE 120 may be equipped with antennas 252a through 252r.

At the base station 110, a transmit processor 220 may receive data from a data source 212 and control information from a controller/processor 240. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 220 may process (e.g., encode and symbol map) the data and control information to obtain data symbols and control symbols, respectively. The processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. For example, the TX MIMO processor 230 may perform certain aspects described herein for RS multiplexing. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120, the antennas 252a through 252r may receive the downlink signals from the base station 110 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. For example, MIMO detector 256 may provide detected RS transmitted using techniques described herein. A receive processor 258 may process (e.g., demodulate, deinterleave, and decode) the detected symbols, provide decoded data for the UE 120 to a data sink 260, and provide decoded control information to a controller/processor 280. According to one or more cases, CoMP aspects can include the antennas, as well as some Tx/Rx functionalities, such that they reside in distributed units. For example, some Tx/Rx processings can be done in the central unit, while other processing can be done at the distributed units. For example, in accordance with one or more aspects as shown in the diagram, the BS mod/demod 232 may be in the distributed units.

On the uplink, at the UE 120, a transmit processor 264 may receive and process data (e.g., for the Physical Uplink Shared Channel (PUSCH)) from a data source 262 and control information (e.g., for the Physical Uplink Control Channel (PUCCH) from the controller/processor 280. The transmit processor 264 may also generate reference symbols for a reference signal. The symbols from the transmit processor 264 may be precoded by a TX MIMO processor 266 if applicable, further processed by the demodulators 254a through 254r (e.g., for SC-FDM, etc.), and transmitted to the base station 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the base station 110 and the UE 120, respectively. The processor 240 and/or other processors and modules at the base station 110 may perform or direct the processes for the techniques described herein. The processor 280 and/or other processors and modules at the UE 120 may also perform or direct processes for the techniques described herein. The memories 242 and 282 may store data and program codes for the BS 110 and the UE 120, respectively. A scheduler 244 may schedule UEs for data transmission on the downlink and/or uplink.

Example Computer System and Multiple Layer Model

Figure 3:
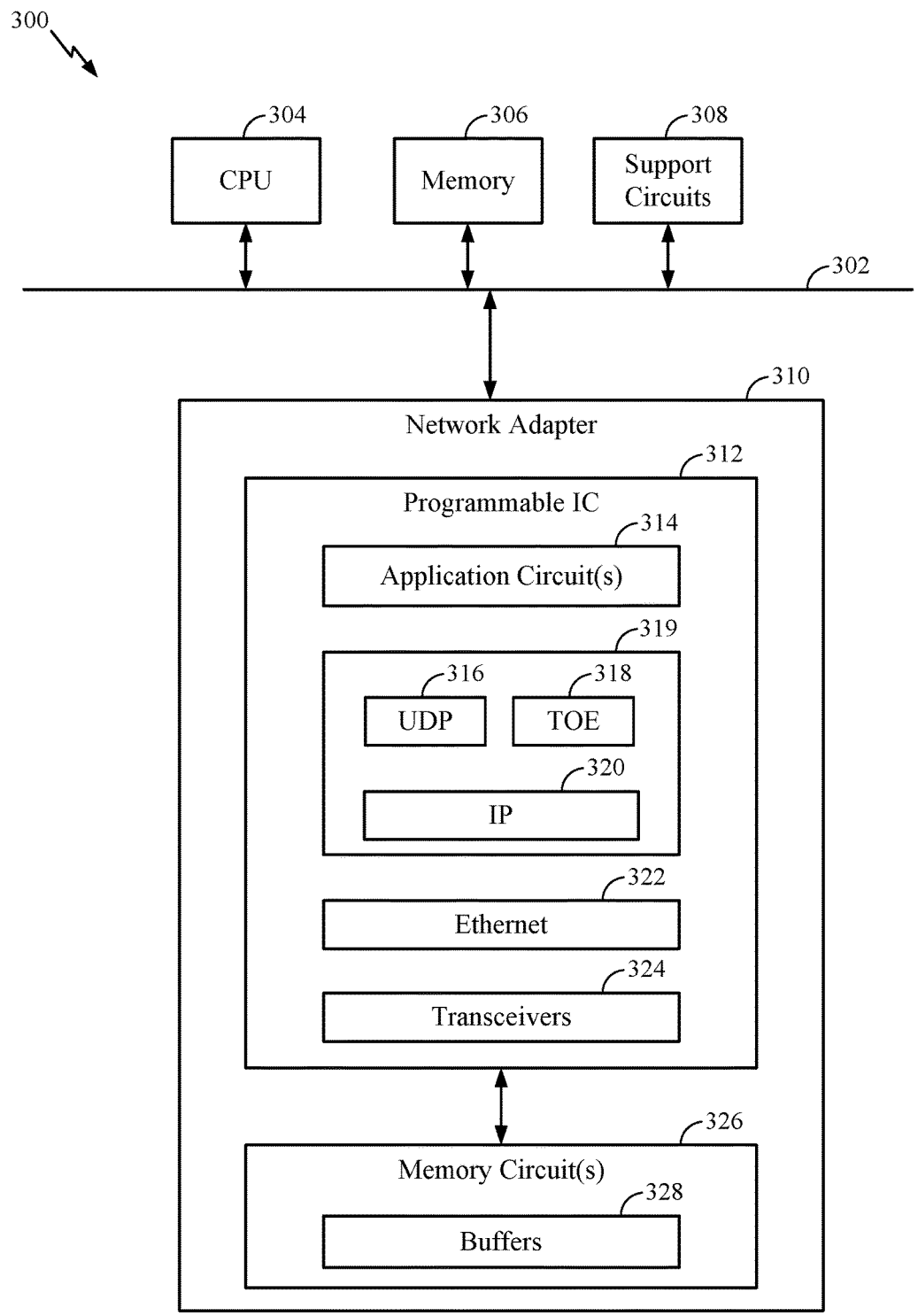
FIG. 3 illustrates a block diagram depicting an example of a computer system.

FIG. 3 is a block diagram depicting an example of a computer system 300 that may be used to implement one or more disclosed cases and/or features. The computer system 300 includes a central processing unit (CPU) 304, a memory 306, various support circuits 308, and a network adapter 310, each of which is coupled to a bus 302. The CPU 304 can include one or more microprocessors. The support circuits 308 can include conventional cache, power supplies, clock circuits, data registers, IO interfaces, and the like. The memory 306 may store all or portions of one or more programs for execution by the CPU 304. The memory 306 can also store data for use by components in the computer system 300, such as the CPU 304 and the network adapter 310. The memory 306 can include one or more of random access memory (RAM), read only memory (ROM), magnetic read/write memory, FLASH memory, solid state memory, or the like as well as combinations thereof. The network adapter 310 can be coupled to a network (not shown), which allows the computer system 300 to communicate with other computer systems on the network.

The network adapter 310 can include a programmable integrated circuit (IC) 312, such as a field programmable gate array (FPGA). The programmable IC 312 can be coupled to one or more memory circuits (memory circuit(s) 326 and buffers 328). The programmable IC 312 can include various dedicated circuits (e.g., hard circuits) and/or configured circuits (e.g., circuits formed from programmable logic) to perform data processing at various layers using various protocols. In the example shown, the programmable IC 312 can include physical layer circuits, such as transceivers 324 capable of sending and receiving data streams. The programmable IC 312 can include data link layer circuits, such as an Ethernet controller 322. The programmable IC 312 can include a network layer circuit 319, which can include an internet protocol (IP) engine 320, a user datagram protocol (UDP) engine 316, and a transmission control protocol (TCP) offload engine (TOE) 318. The programmable IC 312 can also include various application layer circuit(s) 314. The programmable IC 312 can also use the memory circuit(s) 326.

While the programmable IC 312 is shown as having various components to process data, it is to be understood that some components may be external to the programmable IC 312. For example, the Ethernet controller 322 can be external to the programmable IC 312 on the network adapter 310. In another example, some or all of the application layer circuit(s) 314 can be external to the programmable IC 312 on the network adapter 310. While a network adapter 310 has been described, in other examples, the UDP 316 can be implemented in other devices, such as a separate accelerator or other type of separate circuit that interfaces with a network adapter.

Figure 4:
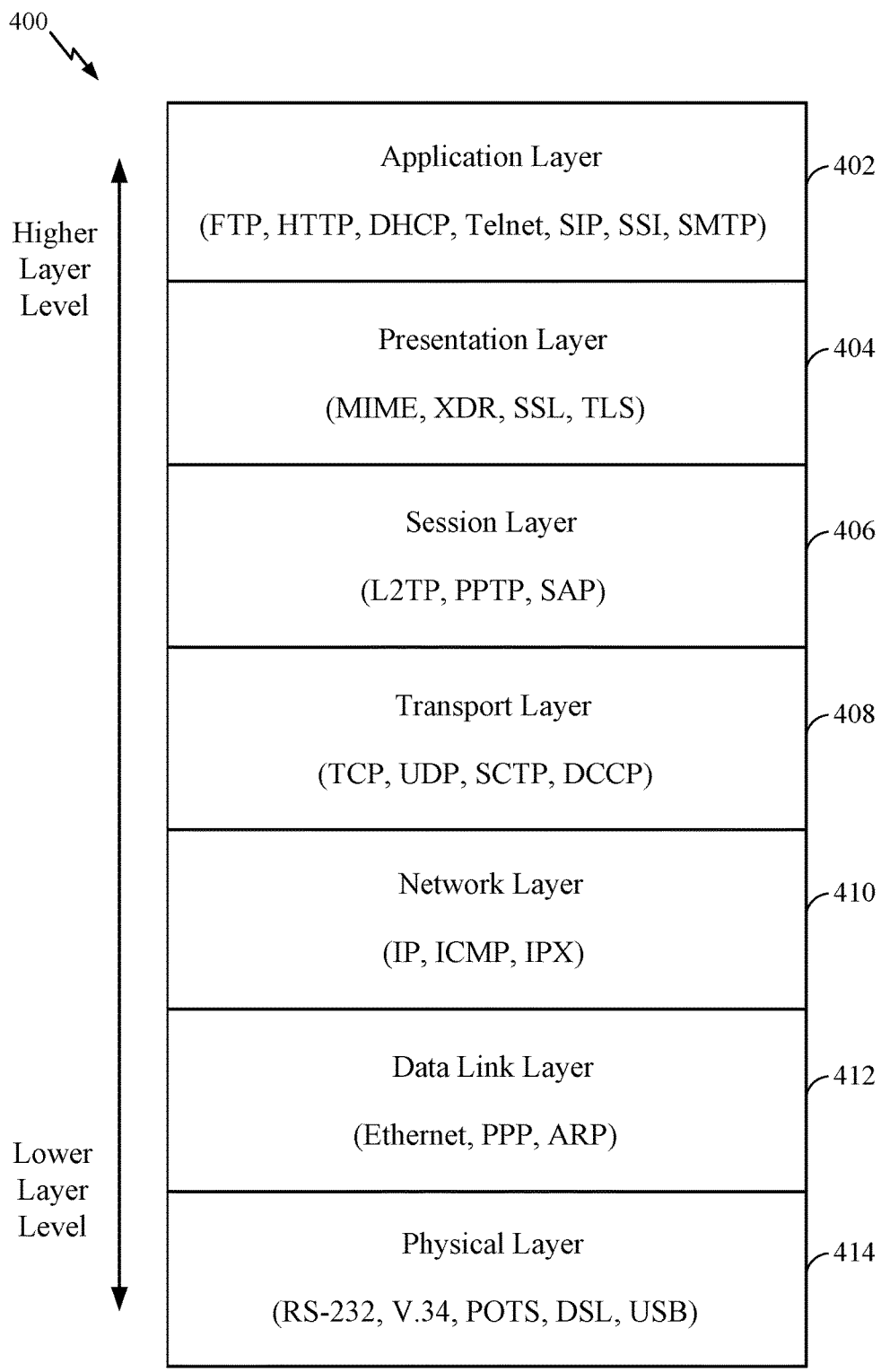
FIG. 4 illustrates an example of network stack represented by an open systems interconnection (OSI) model having multiple layers.

FIG. 4 illustrates one example of an OSI model 400 illustrated by seven layers ranging from "highest" (i.e., conceptually closer to the user) to "lowest" (i.e., bottom level mechanics less noticeable to the user). The OSI model may comprise an Application layer 402 at the top, followed by a Presentation layer 404, Session layer 406, Transport layer 408, Network layer 410, Data Link layer 412, and a Physical layer 414. In other examples, a network stack may be represented using an OSI model that may exclude, combine, and/or supplement some of the layers and may add other layers.

Examples of Standard Processing Through a Network Stack

Figure 5:
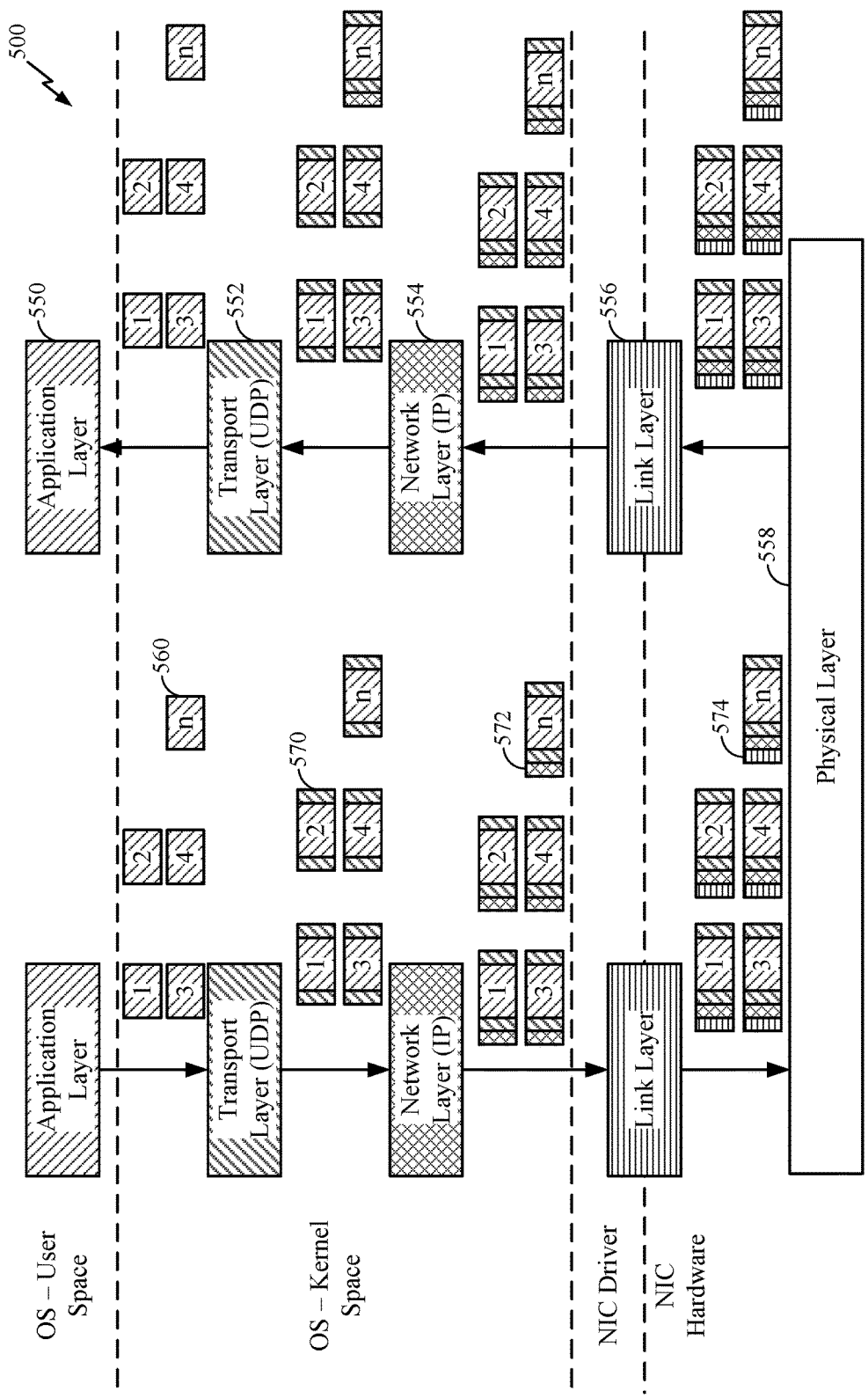
FIG. 5 illustrates standard processing through a network stack that includes multiple layers, in accordance with certain aspects of the present disclosure.

FIG. 5 illustrates a system diagram 500 of standard processing through a network stack that includes multiple processing layers 550, 552, 554, 556, and 558, in accordance with certain aspects of the present disclosure. For example, FIG. 5 describes a UDP/IP communication system 500 comprised of a single transmitter, a single receiver and single communication link. Data generated at the application layer 550 traverses through the UDP/IP stack. Each processing layer of the stack adds wrappers 570, 572, and 574 on the Payload 560 received from upper layer.

Unlike stream based protocols (e.g. TCP) where the packet boundaries are not visible to the receiving application due to each packet representing a fraction of data within an endless stream, in Packet-based protocol (e.g. UDP) each packet stands on its own and may therefore be consumed individually by the receiving application. In addition, there is no protocol-level indication of the order in which packets are generated/received. Hence, besides some specific edge-cases, these packets cannot be combined into a single "coalesced-packet". This leads to a scenario where many packets are being processed separately by each processing layer 550, 552, 554, 556, and 558 of the network stack, even though the Transport layer 552 and below layers 554, 556, and 558 are substantially identical except for some specific packet characteristics such as, for example, Length and checksum fields.

Example of UDP Receive Offloading

In accordance with one or more aspects of embodiments disclosed herein, a method to reduce the UDP overhead processing without manipulating the characteristics of the UDP connection is provided.

For example, as throughput rises, overhead of processing UDP connection may rise as well. In one or more cases, utilizing a particular open source or non-open source environment may allow for the execution of a protocol specific offloading feature. Thus, in accordance with one or more cases, a UDP specific offloading can be used to coalesce UDP Packets into a single packet. The Coalesced packet may be pushed along the stack, and may be re-partitioned into the original UDP Packets just before sending these buffers to the socket.

Figure 6:
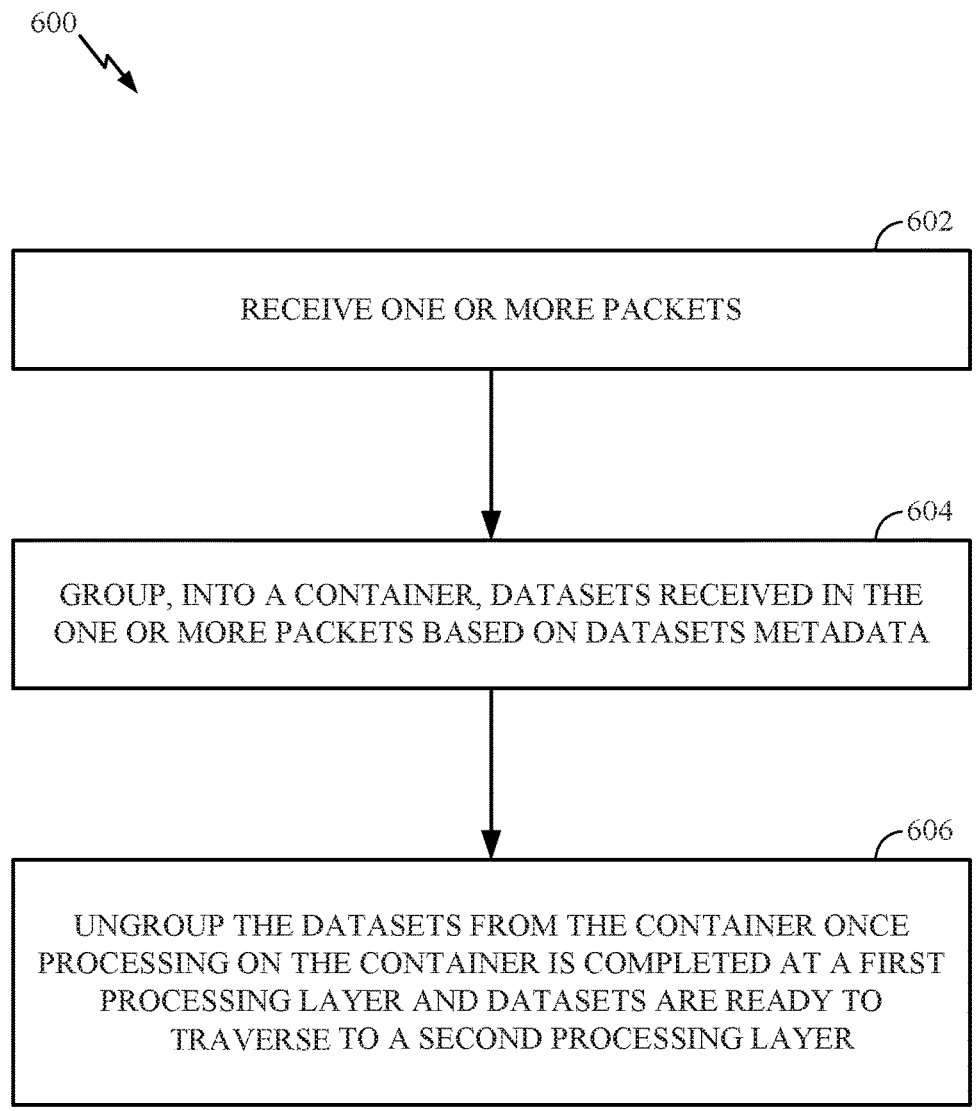
FIG. 6 illustrates example operations for processing datasets at a receiver, in accordance with aspects of the present disclosure.

For example, FIG. 6 illustrates example operations 600 for processing datasets at a receiver, in accordance with aspects of the present disclosure.

Specifically, operations 600 begin, at 602, with receiving one or more packets. At 604, the operations 600 include grouping, into a container, datasets received in the one or more packets based on datasets metadata. Further, operations 600 include, at 606, ungrouping the datasets from the container once processing on the container is completed at a first processing layer and datasets are ready to traverse to a second processing layer.

Figure 7:
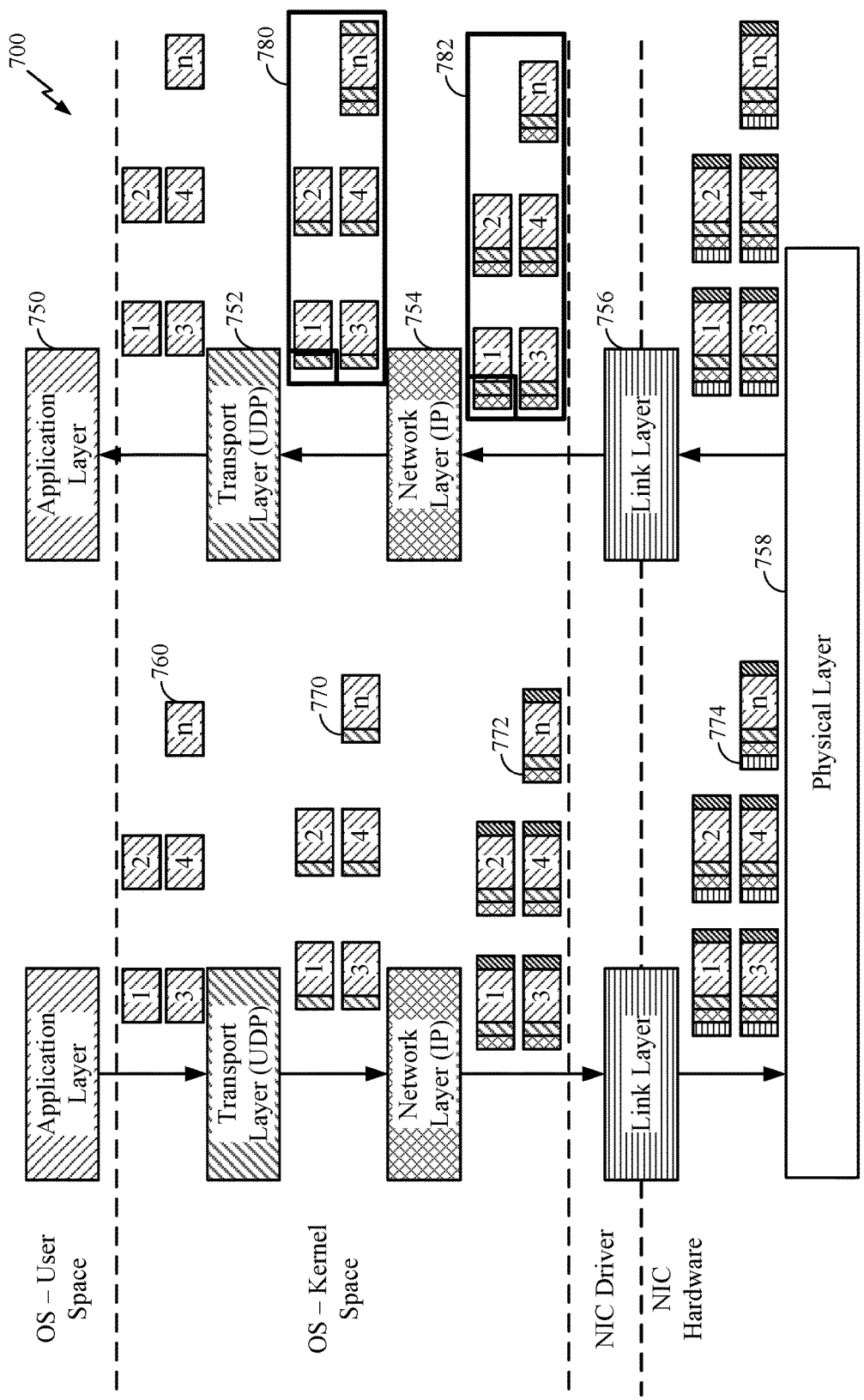
FIG. 7 illustrates an example of received packet boxing and unboxing through a network stack, in accordance with aspects of the present disclosure.

FIG. 7 illustrates an example of a system diagram 700 of received packet grouping and ungrouping, which may also be called boxing and unboxing, through a network stack, in accordance with aspects of the present disclosure.

For example, processing through a network stack that includes multiple processing layers 750, 752, 754, 756, and 758, in accordance with certain aspects of the present disclosure is shown. FIG. 7 also describes a UDP/IP communication system 700 comprised of a single transmitter, a single receiver and single communication link. Data generated at the application layer 750 traverses through the UDP/IP stack. Each processing layer of the stack may add some wrappers 770, 772, and 774 on the payload 760 received from upper layer.

In contrast to FIG. 5, in accordance with one or more cases, FIG. 7 describes a packet-based (e.g. UDP) communication system 700 with a received packet boxing mechanism enabled. In one or more cases, while the transmitter side remains intact, the boxing mechanism may group or "boxes" multiple packets with similar headers into a single container 780 and/or 782. In one or more cases, a container can be a formatted data unit that includes control information in a header and user data as the payload. For example a container may include a plurality of packets and/or datasets as the user data/payload. In one or more cases, the container 780 and/or 782 has a single header 790 that may be the exact same header as the first packet added to the group/box 782. This header 790 may be processed along the network stack, until it is ready to be delivered to the end-user (for example, the Application layer 750 as shown in FIG. 7). Because all the headers may be identical only a single header is processed per container. In one or more cases, and identical header refers to headers where all fields which are not "packet specific" such as Packet length and Checksum are identical. This single header processing per container, rather than multiple header processing for each individual packet, may help reduce the load on the UDP/IP stack.

Once the container is ready to leave the network stack each packet's header within the container can be overwritten with the container's header. This is done while taking steps such that the packet specific information such as length is retained from the original header. In addition, in cases where a checksum exist, the checksum should be recalculated to reflect changes in the header, if any were made. If the container's destination is the application layer, no additional header processing is required. And each payload can be retrieved from the container upon each execution of recvfrom( ).

According to one or more case, a grouping mechanics example, which may also be called boxing mechanics, may include one or more of the following features. In order to increase the UDP/IP stack savings, the grouping mechanics may avoid a memcpy( ) execution for boxing all UDP packets together. Instead, an skb-chaining mechanism may be used to box several packets altogether while retaining the original packet size and header. This can be achieved by implementing the suggested logic using a GRO infrastructure, and indicating that the first socket buffer (SKB) is a container.

In one or more cases, an ungrouping mechanics example, which is also referred to as unboxing mechanics example, may include one or more of the following features. In order to efficiently unbox packets from a container, an SKB which is marked as a container may move a chained SKB from the container to the destination of the data (for example, an application layer, a next hop, etc.). If the data sink requires headers the SKB header may be updated with the containers fields, and may be sent to the data sink. Once a single SKB is left in the container, the container indication may be deleted, and the container may be handled as a regular packet.

According to one or more cases, a method of grouping/boxing datasets of same source and destination may include a number of operations. Particularly, the method may include boxing datasets arriving at the receiver as a function of the dataset metadata, and unboxing the datasets from the container once network layer processing on the container is completed and datasets are ready to traverse to their next destination.

According to one or more cases, boxing datasets may include creating a container, and dynamically determining the datasets that are to be boxed in the same container based on dataset metadata, as well as dynamically copy based or copy-less adding of datasets into the container. Additionally, boxing datasets may include setting the container to allow simple manipulation of the metadata on which boxing mechanism relies.

In one or more cases, unboxing datasets may include determination of a container, and dynamically removing datasets from the container while maintaining network layer processing that may have changed the dataset as well as discarding a container.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in the appended figures.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of processing datasets at a receiver, comprising:
   receiving one or more packets;
   grouping, into a container, datasets received in the one or more packets based on datasets metadata, comprising:
      providing the container with a single header; and
   ungrouping the datasets from the container once processing on the container is completed at a first processing layer of a network stack and datasets are ready to traverse to a second processing layer of the network stack.

2. The method of claim 1, wherein grouping the datasets comprises:
   creating the container; and
   dynamically determining the datasets that are to be grouped in the container based on dataset metadata.

3. The method of claim 2, wherein grouping datasets further comprises:
   dynamically copy based or copy-less adding of the datasets into the container.

4. The method of claim 3, wherein grouping datasets further comprises:
   setting the container to allow manipulation of the metadata on which a grouping mechanism relies.

5. The method of claim 1, wherein grouping the datasets comprises:
   grouping, into the container, one or more of the packets based on the datasets metadata indicating that the multiple packets have similar headers.

6. The method of claim 5, wherein the single header is the same header as a first packet from the one or more packets added to the container.

7. The method of claim 1, wherein ungrouping datasets comprises:
   determining the container to be ungrouped; and
   dynamically removing datasets from the container while maintaining changes to the datasets made by network layer processing.

8. The method of claim 7, wherein ungrouping datasets further comprises:
   discarding the container.

9. The method of claim 1, wherein ungrouping data sets comprises:
   overwriting each original packet header within the container with the single header.

10. The method of claim 9, wherein ungrouping data sets further comprises:
    retaining packet specific information including length from the original packet header.

11. The method of claim 10, wherein ungrouping data sets further comprises:
    recalculating a checksum value to reflect any changes in the original packet header.

12. An apparatus for processing datasets by a receiver, comprising:
    means for receiving one or more packets;
    means for grouping, into a container, datasets received in the one or more packets based on datasets metadata, comprising:
       means for providing the container with a single header; and
    means for ungrouping the datasets from the container once processing on the container is completed at a first processing layer of a network stack and datasets are ready to traverse to a second processing layer of the network stack.

13. The apparatus of claim 12, wherein the means for grouping the datasets comprises:
    means for creating the container; and
    means for dynamically determining the datasets that are to be grouped in the container based on dataset metadata.

14. The apparatus of claim 13, wherein the means for grouping datasets further comprises:
    means for dynamically copy based or copy-less adding of the datasets into the container.

15. The apparatus of claim 14, wherein the means for grouping datasets further comprises:
    means for setting the container to allow manipulation of the metadata on which a grouping mechanism relies.

16. The apparatus of claim 12, wherein the means for grouping the datasets comprises:

means for grouping, into the container, one or more of the packets based on the datasets metadata indicating that the multiple packets have similar headers.

17. The apparatus of claim 16, wherein the single header is the same header as a first packet from the one or more packets added to the container.

18. The apparatus of claim 12, wherein the means for ungrouping datasets comprises:
means for determining the container to be ungrouped; and
means for dynamically removing datasets from the container while maintaining changes to the datasets made by network layer processing.

19. The apparatus of claim 18, wherein the means for ungrouping datasets further comprises:
means for discarding the container.

20. The apparatus of claim 12, wherein the means for ungrouping data sets comprises:
means for overwriting each original packet header within the container with the single header.

21. The apparatus of claim 20, wherein the means for ungrouping data sets further comprises:
means for retaining packet specific information including length from the original packet header.

22. The apparatus of claim 21, wherein the means for ungrouping data sets further comprises:
means for recalculating a checksum value to reflect any changes in the original packet header.

23. An apparatus for processing datasets at a receiver, comprising:
at least one processor configured to:
receive one or more packets;
group, into a container, datasets received in the one or more packets based on datasets metadata, comprising
to provide the container with a single header; and
ungroup the datasets from the container once processing on the container is completed at a first processing layer of a network stack and datasets are ready to traverse to a second processing layer of the network stack; and
a memory coupled to the at least one processor configured to store one or more of the received one or more packets, the container, and the datasets.

24. A non-transitory computer readable medium for processing datasets at a receiver having instructions stored thereon for:
receiving one or more packets;
grouping, into a container, datasets received in the one or more packets based on datasets metadata, comprising:
providing the container with a single header; and
ungrouping the datasets from the container once processing on the container is completed at a first processing layer of a network stack and datasets are ready to traverse to a second processing layer of the network stack.

* * * * *